United States Patent
Solomentsev et al.

(10) Patent No.: US 12,017,678 B2
(45) Date of Patent: Jun. 25, 2024

(54) MULTISPECTRAL LIDAR SYSTEMS AND METHODS

(71) Applicant: YANDEX SELF DRIVING GROUP LLC, Moscow (RU)

(72) Inventors: Dmitry Valentinovich Solomentsev, Moscow (RU); Andrey Viktorovich Golikov, Moscow (RU); Nikolay Evgenevich Orlov, Sarapul (RU); Vladimir Albertovich Kuznetsov, Moscow (RU)

(73) Assignee: Direct Cursus Technology L.L.C, Dubai (AE)

( * ) Notice: Subject to any disclaimer, the term of this patent is extended or adjusted under 35 U.S.C. 154(b) by 336 days.

(21) Appl. No.: 17/477,159

(22) Filed: Sep. 16, 2021

(65) Prior Publication Data

US 2022/0111863 A1    Apr. 14, 2022

(30) Foreign Application Priority Data

Oct. 9, 2020  (RU) ............................ RU2020133313

(51) Int. Cl.
*B60W 60/00* (2020.01)
*G01S 13/00* (2006.01)
*G01S 17/00* (2020.01)

(52) U.S. Cl.
CPC ........... *B60W 60/001* (2020.02); *G01S 13/00* (2013.01); *G01S 17/00* (2013.01)

(58) Field of Classification Search
CPC ...... B60W 60/001; G01S 13/00; G01S 17/00; G01S 7/4815; G01S 17/931
See application file for complete search history.

(56) References Cited

U.S. PATENT DOCUMENTS 10,061,019 B1    8/2018  Campbell et al.
10,094,925 B1   10/2018  Lachapelle
(Continued)

FOREIGN PATENT DOCUMENTS

CN    106443707 A       2/2017
CN    110658433 A   *   1/2020
(Continued)

OTHER PUBLICATIONS

Translation of (DE 102016102610 A1), (Year: 2016).*
(Continued)

*Primary Examiner* — Tarifur R Chowdhury
*Assistant Examiner* — Carlos Perez-Guzman
(74) *Attorney, Agent, or Firm* — BCF LLP (57) ABSTRACT

An optical system and method for controlling the system, and a self-driving vehicle connected thereto. The optical system includes a housing; a first light source configured to emit light in a first wavelength band; a second light source configured to emit light in a second wavelength band different from the first wavelength band; a dichroic element configured for combining light from the first light source and the second light source into an output light beam to be scanned over a field of view; a scanning unit configured to direct output beam outwardly from the optical system, the scanning unit being disposed in the housing; a controller communicatively coupled with the scanning unit; and at least one sensor communicatively coupled with the controller and configured to sense light reflected off surrounding objects into the optical system.

13 Claims, 4 Drawing Sheets

(56) References Cited

U.S. PATENT DOCUMENTS

| | | |
|---|---|---|
| 10,345,446 B2 | 7/2019 | Raring et al. |
| 2006/0231771 A1* | 10/2006 | Lee .................. G01S 17/95 250/458.1 |
| 2015/0362587 A1 | 12/2015 | Rogan et al. |
| 2017/0307736 A1 | 10/2017 | Donovan |
| 2017/0372602 A1 | 12/2017 | Gilliland et al. |
| 2018/0188371 A1 | 7/2018 | Bao et al. |
| 2018/0239021 A1 | 8/2018 | Akselrod et al. |
| 2018/0284282 A1 | 10/2018 | Hong et al. |
| 2018/0284286 A1 | 10/2018 | Eichenholz et al. |
| 2019/0017870 A1* | 1/2019 | Coffin ............... G01J 3/0235 |
| 2019/0132572 A1 | 5/2019 | Shen et al. |
| 2019/0196020 A1 | 6/2019 | Aceti et al. |
| 2019/0221988 A1* | 7/2019 | Villeneuve ........ G01S 7/4865 |
| 2019/0250254 A1 | 8/2019 | Campbell et al. |
| 2019/0361100 A1 | 11/2019 | Abari et al. |
| 2020/0116832 A1 | 4/2020 | Singer |
| 2020/0116837 A1 | 4/2020 | Aghari et al. |
| 2020/0150238 A1 | 5/2020 | Smith et al. |
| 2020/0284883 A1 | 9/2020 | Ferreira et al. |
| 2021/0349189 A1* | 11/2021 | van Seeters ......... G01S 7/4813 |

FOREIGN PATENT DOCUMENTS

| | | |
|---|---|---|
| DE | 102016102610 A1 | 8/2016 |
| WO | 2020002164 A1 | 1/2020 |

OTHER PUBLICATIONS

European Search Report dated Feb. 18, 2022 issued in respect of the counterpart European Patent Application No. 21198068.5.

Russian Search Report dated Oct. 18, 2022 issued in respect of the counterpart Russian Patent Application No. RU 2020133313.

* cited by examiner

MULTISPECTRAL LIDAR SYSTEMS AND METHODS

CROSS-REFERENCE

The present application claims priority to Russian Patent Application No. 2020133313, entitled "Multispectral Lidar Systems and Methods", filed Oct. 9, 2020, the entirety of which is incorporated herein by reference.

TECHNICAL FIELD

The present technology relates generally to Light Detection and Ranging (LiDAR) systems; and in particular, to multispectral LiDAR methods and systems.

BACKGROUND

LiDAR systems (Light Detection and Ranging systems, also referred to as LIDAR or Lidar systems) are widely used in self-driving (autonomous) vehicles. LiDAR systems allow measurement of distances between the system and surrounding objects by irradiating the surroundings with light and collecting light reflected from one or more objects in the surroundings.

In a typical LiDAR system, a light source emits narrow beams which are scanned across a field of view. Light reflected and/or scattered from an object in the field of view is received by a detection unit of the LiDAR system to determine a position of the object. For ToF systems, for example, time between (i) emission of the light beam and (ii) detection of the reflected and/or scattered light beam is measured to determine the distance to the object.

The reflected beams received by the LiDAR are processed to generate data points using a central computer, each pulse of the beam mapping to one data point in a point cloud representing the surrounding environment as a 3D map. As the 3D map is more or less detailed and accurate depending on the density or refresh rate of the point cloud, generally speaking, the greater the sampling rate over the field of view, the more detailed and accurate is the 3D map.

Depending on various factors in the surroundings to be scanned by the LiDAR system, the reflected and scattered light being detected to measure distance to surrounding objects can sometimes be weak. In some cases, environmental conditions, such as rain or fog, can affect signal strength due to scattering or absorption of some wavelengths of light that can be used in LiDAR systems. Bright sunlight can similarly affect the signal to noise ratio in some LiDAR symptoms, by introducing additional noise into systems using wavelengths present in sunlight.

SUMMARY

Therefore, there is a need for systems and methods which avoid, reduce or overcome the limitations of the prior art.

In accordance with some broad aspects of the present technology, there is provided a LiDAR system which surveys surroundings of a vehicle in two distinct wavelength bands. The light in both wavelength bands are combined using a dichroic element, such that the beams are co-linear and superimposed. As such, the scanning unit scans the light over the same scene, and the resulting 3D maps created in the two different wavelength bands are aligned, without necessitating registration or other post-processing for placing the 3D maps together. In some cases, one of the wavelength bands may encounter noise or absorption issues due to environmental conditions (such as bright sunlight or rain or fog). In such a case, the 3D map may be created based solely on the light in the less-affected wavelength band.

In accordance with a first broad aspect of the present technology, there is provided an optical system including: a housing; a first light source disposed in the housing, the first light source being configured to emit light in a first wavelength band; a second light source disposed in the housing, the second light source being configured to emit light in a second wavelength band, the second wavelength band being different from the first wavelength band; a dichroic element configured for combining light from the first light source and the second light source into an output light beam to be scanned over a field of view; a scanning unit configured to direct output beam outwardly from the optical system, the scanning unit being disposed in the housing; a controller communicatively coupled with the scanning unit; and at least one sensor communicatively coupled with the controller, the at least one sensor being disposed in the housing, the at least one sensor configured to sense light reflected off surrounding objects into the optical system.

In some embodiments, the at least one sensor comprises a first sensor configured to sense light in the first wavelength band and a second sensor configured to sense light in the second wavelength band.

In some embodiments, at least one of the first sensor and the second sensor is further configured to sense light in a third wavelength band, the third wavelength band being different from the first wavelength band and the second wavelength band, the light of the third wavelength band corresponding to a background radiation within an area of location of the surrounding objects.

In some embodiments, the optical system defines: a first optical branch including the first light source and the first sensor, and a second optical branch including the second light source and the second sensor.

In some embodiments, the optical system further includes a first beam splitting element disposed in the first optical branch, the first beam splitting element being arranged to: direct light incident thereupon from the first light source toward the dichroic element; and direct light incident thereupon from the dichroic element toward the first sensor.

In some embodiments, the optical system further comprises a second beam splitting element disposed in the second optical branch, the second beam splitting element being arranged to: direct light incident thereupon from the second light source toward the dichroic element; and direct light incident thereupon from the dichroic element toward the second sensor.

In some embodiments, each one of the first beam splitting element and the second beam splitting element comprises one of a plate beam splitting element, a cube beam splitting element, and a pellicle beam splitting element.

In some embodiments, the light reflected off the surrounding objects includes at least: a first light portion corresponding to the light emitted by the first light source and subsequently reflecting off the surrounding objects, and a second light portion corresponding to the light emitted by the second light source and subsequently reflecting off the surrounding objects.

In some embodiments, the dichroic element is further arranged to: direct the first light portion into the first optical branch, and direct the second light portion into the second optical branch.

In some embodiments, the dichroic element is further configured to: direct the first light portion toward the first sensor, and direct the second light portion toward the second sensor.

In some embodiments, the dichroic element comprises one of: a dichroic filter, a dichroic mirror, a dichroic beam splitting element, a multi-band beam splitting element, a Bragg mirror, and a multi-band dichroic mirror.

In some embodiments, a center wavelength of the first wavelength band and a center wavelength of the second wavelength band are separated, within a spectrum of electromagnetic radiation, by a predetermined wavelength interval.

In some embodiments, at least one of the first wavelength band and the second wavelength band is configured to operate in a given environmental condition.

In some embodiments, the given environmental condition is associated with at least one of: an amount of daylight and an amount of precipitation.

In some embodiments, the first light source and the second light source are monochromatic light sources respectively associated with a first operating wavelength and a second operating wavelength, the first operating wavelength being different from the second operating wavelength.

In some embodiments, the scanning unit further comprises an exit window facing outwardly from the optical system, such that: the dichroic element and the exit window are arranged sequentially along a common optical axis, thereby defining a single optical path for the light emitted by the first light source and the light emitted by the second light source from the dichroic element to the exit window.

In some embodiments, the scanning unit defines the field of view of the optical system; and the light from the first light source and the light from the second light source being equally distributed across the field of view.

In some embodiments, the controller is further communicatively coupled with the first light source and the second light source, the controller being configured to cause each one of the first light source and the second light source to emit the light in the respective one of the first wavelength band and the second wavelength band simultaneously, thereby generating the output beam.

In some embodiments, the controller is further configured to generate a 3D point map of the surrounding objects based on the light reflected therefrom, each point of the 3D point map being generated in response to both the first light source and the second light source emitting the light without necessitating mutual synchronization therebetween.

In accordance with another broad aspect of the present technology, there is provided a method for controlling an optical system, the method being executable by a controller of the optical system. The method includes causing, by the controller, a first light source to emit light, the first light source being configured to emit light in a first wavelength band; causing, by the controller, a second light source to emit light, the second light source being configured to emit light in a second wavelength band, the second wavelength band being different from the first wavelength band; causing, by the controller, a scanning unit to scan light from the first light source and the second light source over a field of view of the optical system, light from the first light source and the second light source having been combined onto a single optical path by a dichroic element prior to scanning the light over the field of view; sensing, by at least one sensor communicatively coupled with the controller, a reflected signal of light reflected off surrounding objects in the field of view of the optical system.

In some embodiments, the at least one sensor includes a first sensor and a second sensor; and the sensing the reflected signal further includes: sensing, by the first sensor, a first portion of the reflected signal, the first portion being of the first wavelength band; and sensing, by the second sensor, a second portion of the reflected signal, the second portion being of the second wavelength band.

In some embodiments, the method further includes generating, based on the reflected signal, a 3D point map of the surrounding objects.

In some embodiments, the method further includes selecting, based on one or more quality characteristics associated with the reflected signal, one of the first portion and the second portion thereof for generating the 3D point map.

In some embodiments, emitting the light, by each one of the first light source and the second light source, comprises generating a respective optical pulse, and the causing, by the controller, each one of the first light source and the second light source to emit light further includes causing each one of the first light source and the second light source to simultaneously generate optical pulses.

In some embodiments, the light from the first light source and the light from the second light source is equally distributed across the field of view of the optical system.

In some embodiments, the single optical path has further been defined between the dichroic element, before entering the scanning unit, and an exit window of the scanning unit facing outwardly from the optical system.

In accordance with another broad aspect of the present technology, there is provided a self-driving vehicle, including: a vehicle; an electronic device communicatively connected to the vehicle, the electronic device being arranged and configured to control the vehicle; and a LiDAR system for monitoring surroundings of the vehicle, the LiDAR system being communicatively connected to the electronic device, the LiDAR system including: a housing; a first light source disposed in the housing, the first light source being configured to emit light in a first wavelength band; a second light source disposed in the housing, the second light source being configured to emit light in a second wavelength band, the second wavelength band being different from the first wavelength band; a dichroic element configured for combining light from the first light source and the second light source into an output light beam to be scanned over a field of view; a scanning unit configured to direct output beam outwardly from the optical system, the scanning unit being disposed in the housing; a controller communicatively coupled with the scanning unit; and at least one sensor communicatively coupled with the controller, the at least one sensor being disposed in the housing, the at least one sensor configured to sense light reflected off surrounding objects into the optical system.

In the context of the present specification, the term "light source" broadly refers to any device configured to emit radiation such as a radiation signal in the form of a beam, for example, without limitation, a light beam including radiation of one or more respective wavelengths within the electromagnetic spectrum. In one example, the light source can be a "laser source". Thus, the light source could include a laser such as a solid-state laser, laser diode, a high power laser, or an alternative light source such as, a light emitting diode (LED)-based light source. Some (non-limiting) examples of the laser source include: a Fabry-Perot laser diode, a quantum well laser, a distributed Bragg reflector (DBR) laser, a distributed feedback (DFB) laser, a fiber-laser, or a vertical-cavity surface-emitting laser (VCSEL). In addition, the laser source may emit light beams in differing formats, such as light pulses, continuous wave (CW), quasi-CW, and so on. In some non-limiting examples, the laser source may include a laser diode configured to emit light at a wavelength between about 650 nm and 1150 nm. Alternatively, the light source may include a laser diode configured to emit light beams at a wavelength between about 800 nm and about 1000 nm, between about 850 nm and about 950 nm, between about 1300 nm and about 1600 nm, or in between any other suitable range. Unless indicated otherwise, the term "about" with regard to a numeric value is defined as a variance of up to 10% with respect to the stated value.

In the context of the present specification, an "output beam" may also be referred to as a radiation beam, such as a light beam, that is generated by the radiation source and is directed downrange towards a region of interest. The output beam may have one or more parameters such as: beam duration, beam angular dispersion, wavelength, instantaneous power, photon density at different distances from light source, average power, beam power intensity, beam width, beam repetition rate, beam sequence, pulse duty cycle, wavelength, or phase etc. The output beam may be unpolarized or randomly polarized, may have no specific or fixed polarization (e.g., the polarization may vary with time), or may have a particular polarization (e.g., linear polarization, elliptical polarization, or circular polarization).

In the context of the present specification, an "input beam" is radiation or light entering the system, generally after having been reflected from one or more objects in the ROI. The "input beam" may also be referred to as a radiation beam or light beam. By reflected is meant that at least a portion of the output beam incident on one or more objects in the ROI, bounces off the one or more objects. The input beam may have one or more parameters such as: time-of-flight (i.e., time from emission until detection), instantaneous power (e.g., power signature), average power across entire return pulse, and photon distribution/signal over return pulse period etc. Depending on the particular usage, some radiation or light collected in the input beam could be from sources other than a reflected output beam. For instance, at least some portion of the input beam could include light-noise from the surrounding environment (including scattered sunlight) or other light sources exterior to the present system.

In the context of the present specification, the term "surroundings" of a given vehicle refers to an area or a volume around the given vehicle including a portion of a current environment thereof accessible for scanning using one or more sensors mounted on the given vehicle, for example, for generating a 3D map of the such surroundings or detecting objects therein.

In the context of the present specification, a "Region of Interest" may broadly include a portion of the observable environment of a LiDAR system in which the one or more objects may be detected. It is noted that the region of interest of the LiDAR system may be affected by various conditions such as but not limited to: an orientation of the LiDAR system (e.g. direction of an optical axis of the LiDAR system); a position of the LiDAR system with respect to the environment (e.g. distance above ground and adjacent topography and obstacles); operational parameters of the LiDAR system (e.g. emission power, computational settings, defined angles of operation), etc. The ROI of LiDAR system may be defined, for example, by a plane angle or a solid angle. In one example, the ROI may also be defined within a certain distance range (e.g. up to 200 m or so).

In the context of the present specification, a "server" is a computer program that is running on appropriate hardware and is capable of receiving requests (e.g. from electronic devices) over a network, and carrying out those requests, or causing those requests to be carried out. The hardware may be implemented as one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. In the context of the present specification, the term "electronic device" implies that a device can function as a server for other electronic devices, however it is not required to be the case with respect to the present technology. Thus, some (non-limiting) examples of electronic devices include self-driving unit, personal computers (desktops, laptops, netbooks, etc.), smart phones, and tablets, as well as network equipment such as routers, switches, and gateways. It should be understood that in the present context the fact that the device functions as an electronic device does not mean that it cannot function as a server for other electronic devices.

In the context of the present specification, the expression "information" includes information of any nature or kind whatsoever capable of being stored in a database. Thus information includes, but is not limited to visual works (e.g. maps), audiovisual works (e.g. images, movies, sound records, presentations etc.), data (e.g. location data, weather data, traffic data, numerical data, etc.), text (e.g. opinions, comments, questions, messages, etc.), documents, spreadsheets, etc.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the words "first", "second", "third", etc. have been used as adjectives only for the purpose of allowing for distinction between the nouns that they modify from one another, and not for the purpose of describing any particular relationship between those nouns. Further, as is discussed herein in other contexts, reference to a "first" element and a "second" element does not preclude the two elements from being the same actual real-world element.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

These and other features, aspects and advantages of the present technology will become better understood with regard to the following description, appended claims and accompanying drawings where:

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Computer System

Figure 1:
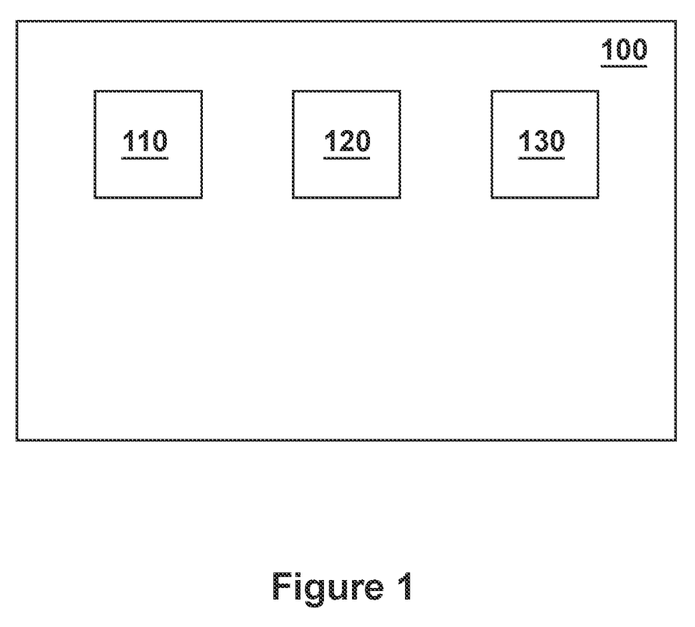
FIG. 1 depicts a schematic diagram of an example computer system configurable for implementing certain non-limiting embodiments of the present technology.

Referring initially to FIG. 1, there is depicted a schematic diagram of a computer system 100 suitable for use with some implementations of the present technology. The computer system 100 includes various hardware components including one or more single or multi-core processors collectively represented by a processor 110, a solid-state drive 120, and a memory 130, which may be a random-access memory or any other type of memory.

Communication between the various components of the computer system 100 may be enabled by one or more internal and/or external buses (not shown) (e.g. a PCI bus, universal serial bus, IEEE 1394 "Firewire" bus, SCSI bus, Serial-ATA bus, etc.), to which the various hardware components are electronically coupled. According to embodiments of the present technology, the solid-state drive 120 stores program instructions suitable for being loaded into the memory 130 and executed by the processor 110 for determining a presence of an object. For example, the program instructions may be part of a vehicle control application executable by the processor 110. It is noted that the computer system 100 may have additional and/or optional components (not depicted), such as network communication modules, localization modules, and the like.

Networked Computing Environment

Figure 2:
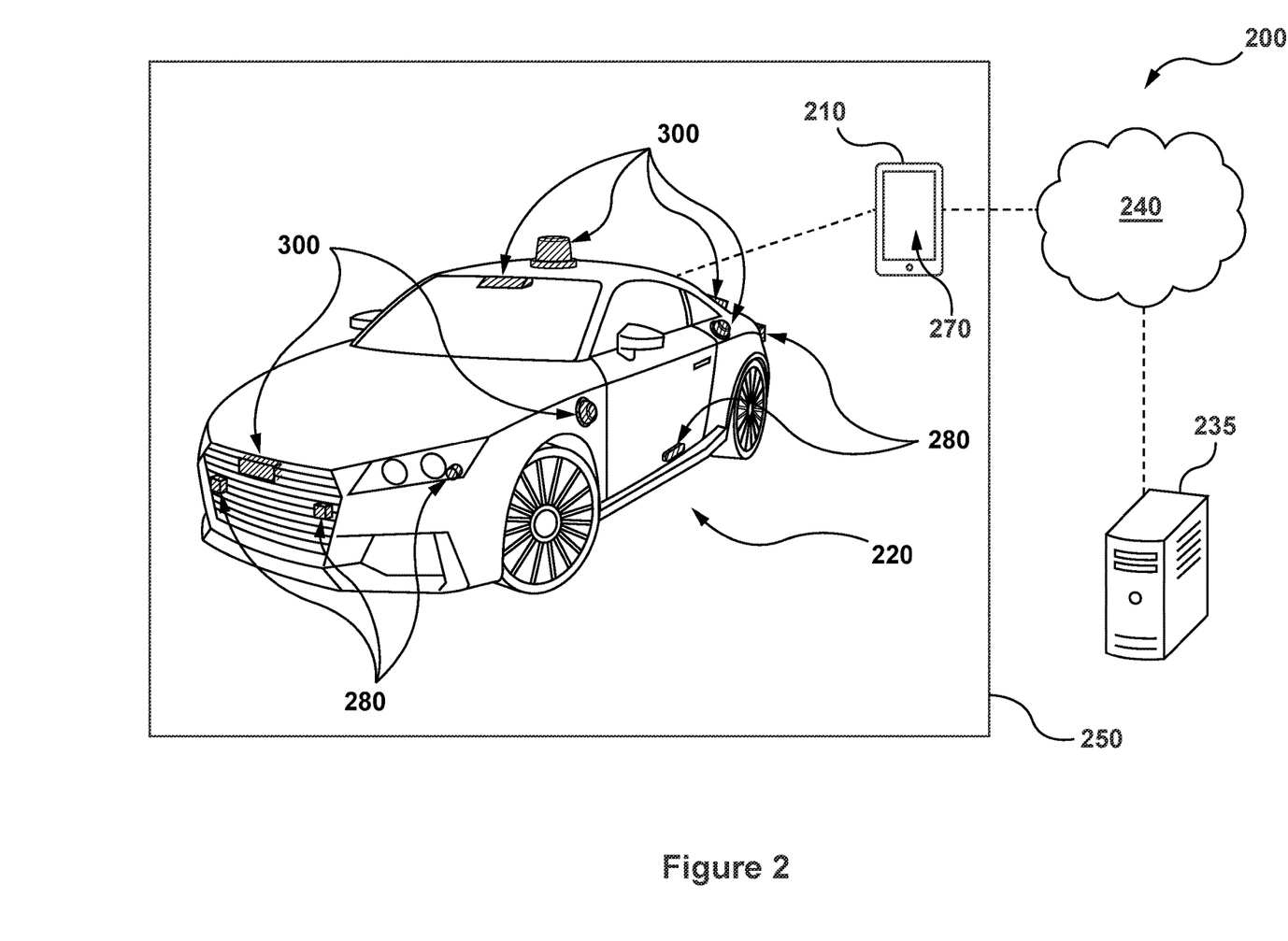
FIG. 2 depicts a schematic diagram of a networked computing environment being suitable for use with certain non-limiting embodiments of the present technology.

With reference to FIG. 2, there is depicted a networked computing environment 200 suitable for use with some non-limiting embodiments of the present technology. The networked computing environment 200 includes an electronic device 210 associated with a vehicle 220 and/or associated with a user (not depicted) who is associated with the vehicle 220 (such as an operator of the vehicle 220). The environment 200 also includes a server 235 in communication with the electronic device 210 via a communication network 240 (e.g. the Internet or the like, as will be described in greater detail herein below).

In at least some non-limiting embodiments of the present technology, the electronic device 210 is communicatively coupled to control systems of the vehicle 220. The electronic device 210 could be arranged and configured to control different operations systems of the vehicle 220, including but not limited to: an ECU (engine control unit), steering systems, braking systems, and signaling and illumination systems (i.e. headlights, brake lights, and/or turn signals). In such an embodiment, the vehicle 220 could be a self-driving vehicle 220.

In some non-limiting embodiments of the present technology, the networked computing environment 200 could include a GPS satellite (not depicted) transmitting and/or receiving a GPS signal to/from the electronic device 210. It will be understood that the present technology is not limited to GPS and may employ a positioning technology other than GPS. It should be noted that the GPS satellite can be omitted altogether.

The vehicle 220, to which the electronic device 210 is associated, could be any transportation vehicle, for leisure or otherwise, such as a private or commercial car, truck, motorbike or the like. Although the vehicle 220 is depicted as being a land vehicle, this may not be the case in each and every non-limiting embodiment of the present technology. For example, in certain non-limiting embodiments of the present technology, the vehicle 220 may be a watercraft, such as a boat, or an aircraft, such as a flying drone.

The vehicle 220 may be user operated or a driver-less vehicle. In some non-limiting embodiments of the present technology, it is contemplated that the vehicle 220 could be implemented as a Self-Driving Car (SDC). It should be noted that specific parameters of the vehicle 220 are not limiting, these specific parameters including for example: vehicle manufacturer, vehicle model, vehicle year of manufacture, vehicle weight, vehicle dimensions, vehicle weight distribution, vehicle surface area, vehicle height, drive train type (e.g. 2× or 4×), tire type, brake system, fuel system, mileage, vehicle identification number, and engine size.

According to the present technology, the implementation of the electronic device 210 is not particularly limited. For example, the electronic device 210 could be implemented as a vehicle engine control unit, a vehicle CPU, a vehicle navigation device (e.g. TomTom™, Garmin™), a tablet, a personal computer built into the vehicle 220, and the like. Thus, it should be noted that the electronic device 210 may or may not be permanently associated with the vehicle 220. Additionally or alternatively, the electronic device 210 could be implemented in a wireless communication device such as a mobile telephone (e.g. a smart-phone or a radio-phone). In certain embodiments, the electronic device 210 has a display 270.

The electronic device 210 could include some or all of the components of the computer system 100 depicted in FIG. 1, depending on the particular embodiment. In certain embodiments, the electronic device 210 is an on-board computer device and includes the processor 110, the solid-state drive 120 and the memory 130. In other words, the electronic device 210 includes hardware and/or software and/or firmware, or a combination thereof, for processing data as will be described in greater detail below.

In some non-limiting embodiments of the present technology, the communication network 240 is the Internet. In alternative non-limiting embodiments of the present technology, the communication network 240 can be implemented as any suitable local area network (LAN), wide area network (WAN), a private communication network or the like. It should be expressly understood that implementations for the communication network 240 are for illustration purposes only. A communication link (not separately numbered) is provided between the electronic device 210 and the communication network 240, the implementation of which will depend, inter alia, on how the electronic device 210 is implemented. Merely as an example and not as a limitation, in those non-limiting embodiments of the present technology where the electronic device 210 is implemented as a wireless communication device such as a smartphone or a navigation device, the communication link can be implemented as a wireless communication link. Examples of wireless communication links may include, but are not limited to, a 3G communication network link, a 4G communication network link, and the like. The communication network 240 may also use a wireless connection with the server 235.

In some embodiments of the present technology, the server 235 is implemented as a computer server and could include some or all of the components of the computer system 100 of FIG. 1. In one non-limiting example, the server 235 is implemented as a Dell™ PowerEdge™ Server running the Microsoft™ Windows Server™ operating system, but can also be implemented in any other suitable hardware, software, and/or firmware, or a combination thereof. In the depicted non-limiting embodiments of the present technology, the server 235 is a single server. In alternative non-limiting embodiments of the present technology, the functionality of the server 235 may be distributed and may be implemented via multiple servers (not shown).

In some non-limiting embodiments of the present technology, the processor 110 of the electronic device 210 could be in communication with the server 235 to receive one or more updates. Such updates could include, but are not limited to, software updates, map updates, routes updates, weather updates, and the like. In some non-limiting embodiments of the present technology, the processor 110 can also be configured to transmit to the server 235 certain operational data, such as routes travelled, traffic data, performance data, and the like. Some or all such data transmitted between the vehicle 220 and the server 235 may be encrypted and/or anonymized.

It should be noted that a variety of sensors and systems may be used by the electronic device 210 for gathering information about surroundings 250 of the vehicle 220. As seen in FIG. 2, the vehicle 220 may be equipped with a plurality of sensor systems 280. It should be noted that different sensor systems from the plurality of sensor systems 280 may be used for gathering different types of data regarding the surroundings 250 of the vehicle 220.

In one example, the plurality of sensor systems 280 may include various optical systems including, inter alia, one or more camera-type sensor systems that are mounted to the vehicle 220 and communicatively coupled to the processor 110 of the electronic device 210. Broadly speaking, the one or more camera-type sensor systems may be configured to gather image data about various portions of the surroundings 250 of the vehicle 220. In some cases, the image data provided by the one or more camera-type sensor systems could be used by the electronic device 210 for performing object detection procedures. For example, the electronic device 210 could be configured to feed the image data provided by the one or more camera-type sensor systems to an Object Detection Neural Network (ODNN) that has been trained to localize and classify potential objects in the surroundings 250 of the vehicle 220.

In another example, the plurality of sensor systems 280 could include one or more radar-type sensor systems that are mounted to the vehicle 220 and communicatively coupled to the processor 110. Broadly speaking, the one or more radar-type sensor systems may be configured to make use of radio waves to gather data about various portions of the surroundings 250 of the vehicle 220. For example, the one or more radar-type sensor systems may be configured to gather radar data about potential objects in the surroundings 250 of the vehicle 220, such data potentially being representative of a distance of objects from the radar-type sensor system, orientation of objects, velocity and/or speed of objects, and the like.

It should be noted that the plurality of sensor systems 280 could include additional types of sensor systems to those non-exhaustively described above and without departing from the scope of the present technology.

System Overview

According to the present technology and as is illustrated in FIG. 2, the vehicle 220 is equipped with at least one Light Detection and Ranging (LiDAR) system, such as a LiDAR system 300, for gathering information about surroundings 250 of the vehicle 220. While only described herein in the context of being attached to the vehicle 220, it is also contemplated that the LiDAR system 300 could be a stand alone operation or connected to another system.

According to non-limiting embodiments of the present technology, the LiDAR systems 300 of the vehicle 220 are communicatively connected to the electronic device 210. In some non-limiting embodiments, information received by the electronic device 210 from one or more of the LiDAR systems 300 could be used, at least in part, in controlling the vehicle 220. For example, in embodiments where the vehicle 220 is a self-driving vehicle 220, 3D maps created based on information determined by the LiDAR systems 300 (described further below) could be used by the electronic device 210 to control, at least in part, the self-driving vehicle 220.

Depending on the embodiment, the vehicle 220 could include more or fewer LiDAR systems 300 than illustrated. Depending on the particular embodiment, choice of inclusion of particular ones of the plurality of sensor systems 280 could depend on the particular embodiment of the LiDAR system 300. The LiDAR system 300 could be mounted, or retrofitted, to the vehicle 220 in a variety of locations and/or in a variety of configurations.

For example, depending on the implementation of the vehicle 220 and the LiDAR system 300, the LiDAR system 300 could be mounted on an interior, upper portion of a windshield of the vehicle 220. Nevertheless, as illustrated in FIG. 2, other locations for mounting the LiDAR system 300 are within the scope of the present disclosure, including on a back window, side windows, front hood, rooftop, front grill, front bumper or the side of the vehicle 220. In some cases, the LiDAR system 300 can even be mounted in a dedicated enclosure mounted on the top of the vehicle 220.

In some non-limiting embodiments, such as that of FIG. 2, a given one of the plurality of LiDAR systems 300 is mounted to the rooftop of the vehicle 220 in a rotatable configuration. For example, the LiDAR system 300 mounted to the vehicle 220 in a rotatable configuration could include at least some components that are rotatable 360 degrees about an axis of rotation of the given LiDAR system 300. When mounted in rotatable configurations, the given LiDAR system 300 could gather data about most of the portions of the surroundings 250 of the vehicle 220.

In some non-limiting embodiments of the present technology, such as that of FIG. 2, the LiDAR systems 300 is mounted to the side, or the front grill, for example, in a non-rotatable configuration. For example, the LiDAR system 300 mounted to the vehicle 220 in a non-rotatable configuration could include at least some components that are not rotatable 360 degrees and are configured to gather data about pre-determined portions of the surroundings 250 of the vehicle 220.

Irrespective of the specific location and/or the specific configuration of the LiDAR system 300, it is configured to capture data about the surroundings 250 of the vehicle 220 used, for example, for building a multi-dimensional map of objects in the surroundings 250 of the vehicle 220. Details relating to the configuration of the LiDAR systems 300 to capture the data about the surroundings 250 of the vehicle 220 will now be described.

It should be noted that although in the description provided herein the LiDAR system 300 is implemented as a Time of Flight LiDAR system—and as such, includes respective components suitable for such implementation thereof—other implementations of the LiDAR system 300 are also possible without departing from the scope of the present technology. For example, in certain non-limiting embodiments of the present technology, the LiDAR system 300 may also be implemented as a Frequency-Modulated Continuous Wave (FMCW) LiDAR system according to one or more implementation variants and based on respective components thereof as disclosed in a co-owned U.S. patent application Ser. No. 17/329,255 filed May 25, 2021 entitled "LiDAR DETECTION METHODS AND SYSTEMS"; the content of which is hereby incorporated by reference in its entirety.

Figure 3:
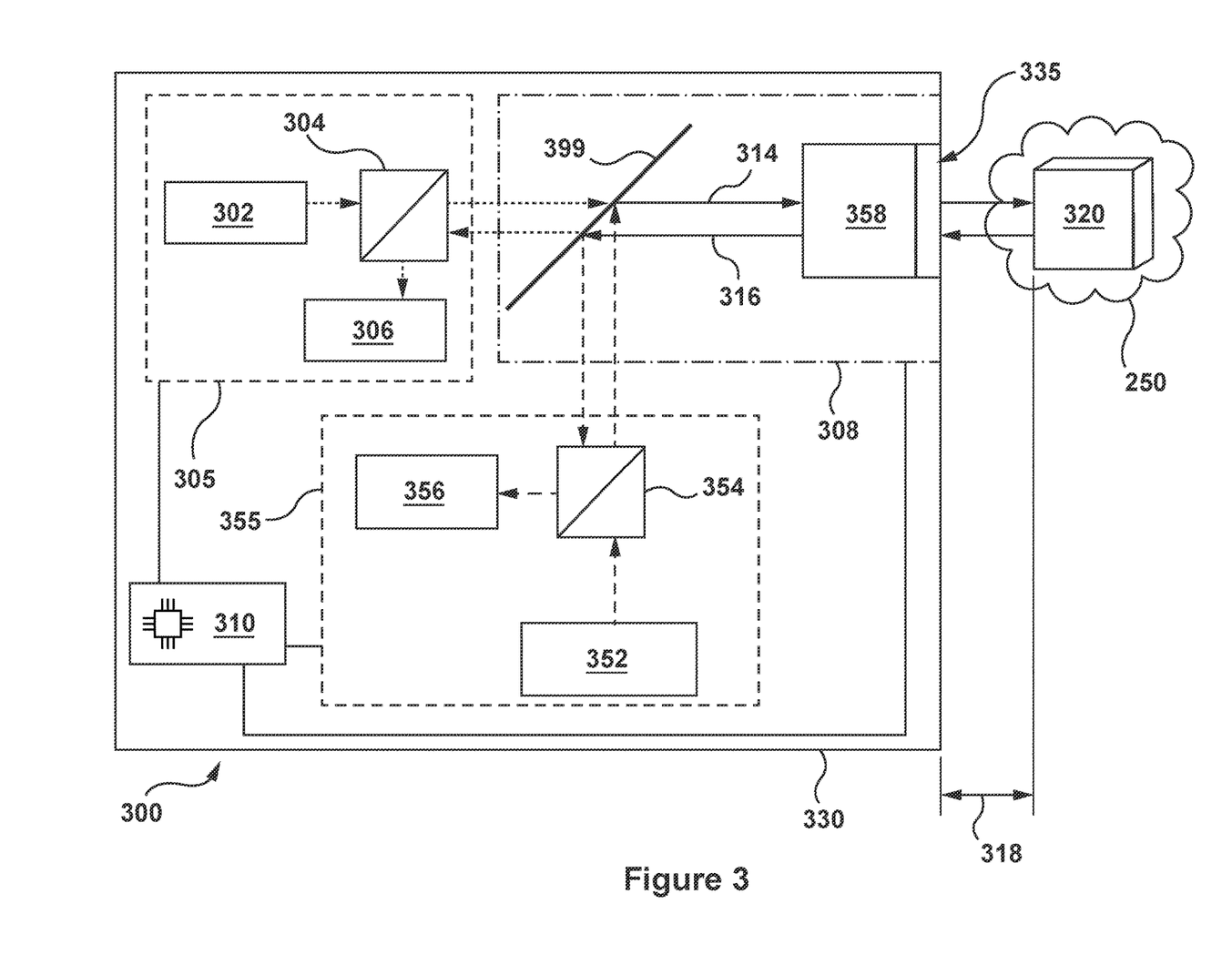
FIG. 3 depicts a schematic diagram of an example LiDAR system implemented in accordance with certain non-limiting embodiments of the present technology.

With reference to FIG. 3, there is depicted a schematic diagram of one particular embodiment of the LiDAR system 300 implemented in accordance with certain non-limiting embodiments of the present technology.

Broadly speaking, the LiDAR system 300 includes a variety of internal components including, but not limited to: (i) a first optical branch 305 which includes a light source 302, a beam splitting element 304, and a sensor 306; (ii) a second optical branch 355 which includes a light source 352, a beam splitting element 354, and a sensor 356; (iii) a scanning unit 308 including a dichroic element 399 and a scanner 358; and (iv) a controller 310. It is contemplated that in addition to the components non-exhaustively listed above, the LiDAR system 300 could include a variety of sensors (such as, for example, a temperature sensor, a moisture sensor, etc.) which are omitted from FIG. 3 for sake of clarity. As will be described in more detail below, the light source 302 and the sensor 306 of the first optical branch 305 are configured to operate in a first wavelength band, and the light source 352 and the sensor 356 of the first second branch 355 are configured to operate in a second wavelength band, different from the first wavelength band.

In certain non-limiting embodiments of the present technology, one or more of the internal components of the LiDAR system 300 are disposed in a common housing 330 as depicted in FIG. 3. In some embodiments of the present technology, the controller 310 could be located outside of the common housing 330 and communicatively connected to the components therein.

Briefly, the LiDAR system 300 operates as follows: the light sources 302, 352 of the optical branches 305, 355 emit light in two different wavelength bands which are combined by the dichroic element 399 to form an output beam 314; the scanner 358 of the scanning unit 308 scans the output beam 314 across the surroundings 250 of the vehicle 220 for locating/capturing data of a priori unknown objects (such as an object 320) therein, for example, for generating a multi-dimensional map of the surroundings 250 where objects (including the object 320) are represented in a form of one or more data points. The elements of the optical branches 305, 355 and the scanning unit 308 will be described in more detail below.

As certain non-limiting examples, the object 320 may include all or a portion of a person, vehicle, motorcycle, truck, train, bicycle, wheelchair, pushchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

Further, let it be assumed that the object 320 is located at a distance 318 from the LiDAR system 300. Once the output beam 314 reaches the object 320, the object 320 generally reflects at least a portion of light from the output beam 314, and some of the reflected light beams may return back towards the LiDAR system 300, to be received in the form of an input beam 316. By reflecting, it is meant that at least a portion of light beam from the output beam 314 bounces off the object 320. A portion of the light beam from the output beam 314 may be absorbed or scattered by the object 320.

As will be described in greater detail below, the input beam 316 is captured by the LiDAR system 300 and separated into two wavelength components by the dichroic element 399 and directed to the appropriate one of the branches 305, 355. Each different wavelength component of the input beam 316 is then sensed by the corresponding sensor 306, 356. The sensors 306, 356 are then configured to generate one or more representative data signals. For example, the sensors 306, 356 may generate an output electrical signal (not depicted) that is representative of the input beam 316. The sensors 306, 356 may also provide the so-generated electrical signal to the controller 310 for further processing. Finally, by measuring a time between emitting the output beam 314 and receiving the input beam 316 the distance 318 to the object 320 is calculated by the controller 310.

Details and alternatives relating to components of the LiDAR system 300, in accordance with certain non-limiting embodiments of the present technology, will be described immediately below. Further detail relating to operation of the LiDAR system 300 is described further below.

Light Sources

The light sources 302, 352 are communicatively coupled to the controller 310 and are each configured to emit light with a given operating wavelength. To that end, in certain non-limiting embodiments of the present technology, each light source 302, 352 could include at least one laser pre-configured for operation at the given operating wavelength. The given operating wavelength of each light source 302, 352 may be in the infrared, visible, and/or ultraviolet portions of the electromagnetic spectrum. For example, each light source 302, 352 may include at least one laser with an operating wavelength between about 650 nm and 1150 nm. Alternatively, each light source 302, 352 may include a laser diode configured to emit light at a wavelength between about 800 nm and about 1000 nm, between about 850 nm and about 950 nm, or between about 1300 nm and about 1600 nm. In certain other embodiments, each light source 302, 352 could include a light emitting diode (LED).

The light sources 302, 352 of the LiDAR system 300 are generally an eye-safe lasers, or put another way, the LiDAR system 300 may be classified as an eye-safe laser system or laser product. Broadly speaking, an eye-safe laser, laser system, or laser product may be a system with some or all of: an emission wavelength, average power, peak power, peak intensity, pulse energy, beam size, beam divergence, exposure time, or scanned output beam such that emitted light from this system presents little or no possibility of causing damage to a person's eyes.

According to certain non-limiting embodiments of the present technology, the operating wavelength of one or both of the light sources 302, 352 may lie within portions of the electromagnetic spectrum that correspond to light produced by the Sun. Therefore, in some cases, sunlight may act as background noise, which can obscure the light signal detected by the LiDAR system 300. This solar background noise can result in false-positive detections and/or may otherwise corrupt measurements of the LiDAR system 300, as will be described further below.

According to non-limiting embodiments of the present technology, the light sources 302, 352 includes pulsed lasers configured to produce, emit, or radiate pulses of light with a certain pulse duration. For example, in some non-limiting embodiments of the present technology, the light sources 302, 352 may be configured to emit pulses with a pulse duration (e.g., pulse width) ranging from 10 ps to 100 ns. In other non-limiting embodiments of the present technology, the light sources 302, 352 may be configured to emit pulses at a pulse repetition frequency of approximately 100 kHz to 5 MHz or a pulse period (e.g., a time between consecutive pulses) of approximately 200 ns to 10 μs. Overall, however, the light sources 302, 352 can generate the output beam 314 with any suitable average optical power, and the output beam 314 may include optical pulses with any suitable pulse energy or peak optical power for a given application.

In some non-limiting embodiments of the present technology, the light sources 302, 352 could include one or more laser diodes, including but not limited to: Fabry-Perot laser diode, a quantum well laser, a distributed Bragg reflector (DBR) laser, a distributed feedback (DFB) laser, or a vertical-cavity surface-emitting laser (VCSEL). Just as examples, a given laser diode operating in the light sources 302, 352 may be an aluminum-gallium-arsenide (AlGaAs) laser diode, an indium-gallium-arsenide (InGaAs) laser diode, or an indium-gallium-arsenide-phosphide (InGaAsP) laser diode, or any other suitable laser diode. It is also contemplated that the light sources 302, 352 may include one or more laser diodes that are current-modulated to produce optical pulses.

In some non-limiting embodiments of the present technology, the light sources 302, 352 are generally configured to emit collimated optical beams, but it is contemplated that the beams produced could have any suitable beam divergence for a given application. Broadly speaking, divergence of the combined output beam 314 is an angular measure of an increase in beam cross-section size (e.g., a beam radius or beam diameter) as the output beam 314 travels away from the LiDAR system 300. In some non-limiting embodiments of the present technology, the output beam 314 may have a substantially circular cross-section.

It is also contemplated that the output beam 314 emitted by light sources 302, 352 could be unpolarized or randomly polarized, could have no specific or fixed polarization (e.g., the polarization may vary with time), or could have a particular polarization (e.g., the output beam 314 may be linearly polarized, elliptically polarized, or circularly polarized).

In at least some non-limiting embodiments of the present technology, the output beam 314 and the input beam 316 are substantially coaxial, as is illustrated schematically in FIG. 3. In other words, the output beam 314 and input beam 316 may at least partially overlap or share a common propagation axis, so that the input beam 316 and the output beam 314 travel along substantially the same optical path (albeit in opposite directions). Nevertheless, in other non-limiting embodiments of the present technology, the output beam 314 and the input beam 316 may not be coaxial, or in other words, may not overlap or share a common propagation axis inside the LiDAR system 300, without departing from the scope of the present technology.

According to the present technology, the light sources 302, 352 operate in two different wavelength bands. It should be noted that it is contemplated that the wavelength bands of the light sources 302, 352 could partially overlap. In some non-limiting embodiments, a center wavelength of the wavelength band of the light source 302 and a center wavelength of the wavelength band of the light source 352 are separated, within a spectrum of electromagnetic radiation, by a predetermined wavelength interval. It should be noted that the wavelength bands could be as wide or narrow as needed by a particular embodiment. For example, in some non-limiting embodiments, the light sources 302, 352 could be monochromatic sources, where the wavelength band is relatively narrow around center or operating wavelengths.

Sensors

According to certain non-limiting embodiments of the present technology, the sensors 306, 356 are communicatively coupled to the controller 310 and may be implemented in a variety of ways. According to the present technology, the sensors 306, 356 include photodetectors, but could include (but is not limited to) photoreceivers, optical receivers, optical sensors, detectors, optical detectors, optical fibers, and the like. As mentioned above, in some non-limiting embodiments of the present technology, the sensors 306, 356 may be configured to acquire or detects at least a portion of the input beam 316 and produce electrical signals that correspond to the input beam 316. For example, if the input beam 316 includes an optical pulse, the one or both sensors 306, 356 may produce an electrical current or voltage pulse that corresponds to the optical pulse detected by one or both sensors 306, 356.

As will be described further below, the sensor 306, of the optical branch 305, is configured to sense reflected light in the wavelength band of the light source 302 and the sensor 356, of the optical branch 355, is configured to sense reflected light in the wavelength band of the light source 352.

In at least some non-limiting embodiments, at least one of the sensors 306, 356 is further configured to sense light in a third wavelength band corresponding to a background radiation within an area of location of the surrounding objects. For example, one of the sensors 306, 356 could be configured to sense sunlight, such that the LiDAR system 300 could identify the level of sunlight in the surroundings.

It is contemplated that, in various non-limiting embodiments of the present technology, the sensors 306, 356 may be implemented with one or more avalanche photodiodes (APDs), one or more single-photon avalanche diodes (SPADs), one or more PN photodiodes (e.g., a photodiode structure formed by a p-type semiconductor and a n-type semiconductor), one or more PIN photodiodes (e.g., a photodiode structure formed by an undoped intrinsic semiconductor region located between p-type and n-type regions), and the like.

In some non-limiting embodiments, the sensors 306, 356 may also include circuitry that performs signal amplification, sampling, filtering, signal conditioning, analog-to-digital conversion, time-to-digital conversion, pulse detection, threshold detection, rising-edge detection, falling-edge detection, and the like. For example, the sensors 306, 356 may include electronic components configured to convert a received photocurrent (e.g., a current produced by an APD in response to a received optical signal) into a voltage signal. The sensors 306, 356 may also include additional circuitry for producing an analog or digital output signal that corresponds to one or more characteristics (e.g., rising edge, falling edge, amplitude, duration, and the like) of a received optical pulse.

Beam Splitting Elements

Each module 305, 355 incudes a beam splitting element 304, 354 for directing light between the wavelength specific elements (light sources 302, 352 and the sensor 306, 356) and the scanning unit 358.

Depending on the implementation of the system 300, the beam splitting elements 304, 354 could be provided in a variety of forms, including but not limited to: a glass prism-based beam splitter component, a half-silver mirror-based beam splitter component, a dichroic mirror prism-based beam splitter component, a fiber-optic-based beam splitter component, and the like.

Thus, according to the non-limiting embodiments of the present technology, a non-exhaustive list of adjustable parameters associated with the beam splitting elements 304, 354, based on a specific application thereof, may include, for example, an operating wavelength range, which may vary from a finite number of wavelengths to a broader light spectrum (from 1200 to 1600 nm, as an example); an income incidence angle; polarizing/non-polarizing, and the like.

In a specific non-limiting example, the beam splitting elements 304, 354 can be implemented as a fiber-optic-based beam splitter component that may be of a type available from OZ Optics Ltd. of 219 Westbrook Rd Ottawa, Ontario K0A 1L0 Canada. It should be expressly understood that the beam splitting element 304 can be implemented in any other suitable equipment.

Dichroic Element

According to the present technology, the LiDAR system 300 includes the dichroic element 399 for combining light from the light sources 302, 352 into the output beam 314 and for separating the input beam 316 into the wavelength bands for sensing by the corresponding sensor 306, 356.

Generally speaking, a dichroic element as implemented in present non-limiting embodiments, is a mirror which has different reflection and transmission properties based on the wavelength or wavelength band of the light incident on the dichroic element, generally for two different specific wavelengths. Dichroic mirrors are also sometimes referred to as laser mirrors, as they are often used to separate pump and emission laser light at an exit window. Depending on the embodiment, the dichroic element could be implemented as a dielectric mirror, but it is contemplated that the dichroic element could be implemented as a crystalline mirror. Depending on the implementation of the system 300, the dichroic element 399 could be provided in a variety of forms, including but not limited to: a dichroic filter, a dichroic mirror, a dichroic beam splitting element, a multi-band beam splitting element, a Bragg mirror, and a multi-band dichroic mirror.

According to non-limiting embodiments, the dichroic element 399 could also be implemented as a short-pass mirror or a long-pass mirror, also referred to as short-pass filters and long-pass filters. For a short-pass mirror, generally speaking, is an optical element having high transmission at shorter wavelengths and high reflectance at longer wavelengths; a long-pass mirror similarly would have high transmission at longer wavelengths and high reflectance at shorter wavelengths. Choice of using a short-pass or long-pass mirror as the dichroic element 399 could depend, among other variables, on the specific wavelength band of light sources 302, 352 and the relative positioning of the light sources 302, 352, the beam splitting elements 304, 354, and the dichroic element 399. For example, in the non-limiting arrangement illustrated in FIG. 3, if the light source 302 has a wavelength band centered on 900 nm and the light source 352 has a wavelength band centered on 500 nm, the dichroic element 399 chosen would be a long-pass mirror, such that the light from the light source 302 would be transmitted through the dichroic element 399 and the light from the light source 352 could be reflected by the dichroic element 399.

Scanning Unit

Generally speaking, the scanning unit 308 steers the output beam 314 in one or more directions downrange towards the surroundings 250. The scanning unit 308 is communicatively coupled to the controller 310. As such, the controller 310 is configured to control the scanning unit 308 so as to guide the output beam 314 in a desired direction downrange and/or along a predetermined scan pattern. Broadly speaking, in the context of the present specification "scan pattern" may refer to a pattern or path along which the output beam 314 is directed by the scanning unit 308 during operation.

In certain non-limiting embodiments of the present technology, the controller 310 is configured to cause the scanning unit 308 to scan the output beam 314 over a variety of horizontal angular ranges and/or vertical angular ranges; the total angular extent over which the scanning unit 308 scans the output beam 314 is referred to herein as the field of view (FoV). It is contemplated that the particular arrangement, orientation, and/or angular ranges could depend on the particular implementation of the LiDAR system 300. The field of view generally includes a plurality of regions of interest (ROIs), defined as portions of the FoV which may contain, for instance, objects of interest. In some implementations, the scanning unit 308 can be configured to further investigate a selected region of interest (ROI) 325. The ROI 325 of the LiDAR system 300 may refer to an area, a volume, a region, an angular range, and/or portion(s) of the surroundings 250 about which the LiDAR system 300 may be configured to scan and/or can capture data.

It should be noted that a location of the object 320 in the surroundings 250 of the vehicle 220 may be overlapped, encompassed, or enclosed at least partially within the ROI 325 of the LiDAR system 300.

It should be noted that, according to certain non-limiting embodiments of the present technology, the scanning unit 308 may be configured to scan the output beam 314 horizontally and/or vertically, and as such, the ROI 325 of the LiDAR system 300 may have a horizontal direction and a vertical direction. For example, the ROI 325 may be defined by 45 degrees in the horizontal direction, and by 45 degrees in the vertical direction. In some implementations, different scanning axes could have different orientations.

By the present technology, for scanning the output beam 314 over the ROI 325, the scanning unit 308 includes a pair of mirrors (not separately depicted), each one of which is independently coupled with a respective galvanometer (not separately depicted) providing control thereto. Accordingly, the controller 310 causes, via the respective galvanometers, rotation of each of the pair of mirrors about a respective one of mutually perpendicular axes associated therewith, thereby scanning the ROI 325 according to the predetermined scan pattern.

In certain non-limiting embodiments of the present technology, the scanning unit 308 may further include a variety of other optical components and/or mechanical-type components for performing the scanning of the output beam 314. For example, the scanning unit 308 may include one or more mirrors, prisms, lenses, MEM components, piezoelectric components, optical fibers, splitters, diffractive elements, collimating elements, and the like. It should be noted that the scanning unit 308 may also include one or more additional actuators (not separately depicted) driving at least some of the other optical components to rotate, tilt, pivot, or move in an angular manner about one or more axes, for example.

In at least some non-limiting embodiments, the scanning unit 308 further includes an exit window 335 facing outwardly from the LiDAR system 300. The dichroic element 399 and the exit window 335 are thus arranged sequentially along a common optical axis, thereby defining a single optical path for the light emitted by the light source 302 and the light emitted by the light source 352 from the dichroic element 399 to the exit window 335. It is also contemplated that the exit window 335 could be omitted in some embodiments.

The LiDAR system 300 may thus make use of the predetermined scan pattern to generate a point cloud substantially covering the ROI 325 of the LiDAR system 300. As will be described in greater detail herein further below, this point cloud of the LiDAR system 300 may be used to render a multi-dimensional map of objects in the surroundings 250 of the vehicle 220.

As will become apparent from the description provided herein below, in certain non-limiting embodiments of the present technology, the predetermined scan pattern for scanning the ROI 325 may be associated with a respective scanning frequency.

Controller

Depending on the implementation, the controller 310 may include one or more processors, an application-specific integrated circuit (ASIC), a field-programmable gate array (FPGA), and/or other suitable circuitry. The controller 310 may also include non-transitory computer-readable memory to store instructions executable by the controller 310 as well as data which the controller 310 may produce based on the signals acquired from other internal components of the LiDAR system 300 and/or may provide signals to the other internal components of the LiDAR system 300. The memory can include volatile (e.g., RAM) and/or non-volatile (e.g., flash memory, a hard disk) components. The controller 310 may be configured to generate data during operation and store it in the memory. For example, this data generated by the controller 310 may be indicative of the data points in the point cloud of the LiDAR system 300.

It is contemplated that, in at least some non-limiting embodiments of the present technology, the controller 310 could be implemented in a manner similar to that of implementing the electronic device 210 and/or the computer system 100, without departing from the scope of the present technology. In addition to collecting data from the sensors 306, 356, the controller 310 could also be configured to provide control signals to, and potentially receive diagnostics data from, the light sources 302, 352 and the scanning unit 308.

As previously stated, the controller 310 is communicatively coupled to the light sources 302, 352, the scanning unit 308, and the sensors 306, 356. In some non-limiting embodiments of the present technology, the controller 310 may be configured to receive electrical trigger pulses from the light sources 302, 352 where each electrical trigger pulse corresponds to the emission of an optical pulse by the light sources 302, 352. The controller 310 may further provide instructions, a control signal, and/or a trigger signal to the light sources 302, 352 indicating when the light sources 302, 352 are to produce optical pulses, for example, for forming the output beam 314.

Just as an example, the controller 310 may be configured to send an electrical trigger signal that includes electrical pulses, so that one or both of the light sources 302, 352 emits an optical pulse, representable by the output beam 314, in response to each electrical pulse of the electrical trigger signal. It is also contemplated that the controller 310 may cause the light sources 302, 352 to adjust one or more characteristics of output beam 314 produced by the light sources 302, 352 such as, but not limited to: frequency, period, duration, pulse energy, peak power, average power, and wavelength of the optical pulses.

By the present technology, the controller 310 is configured to determine a "time-of-flight" value for an optical pulse in order to determine the distance between the LiDAR system 300 and one or more objects in the field of view, as will be described further below. The time of flight is based on timing information associated with (i) a first moment in time when a given optical pulse (for example, of the output beam 314) was emitted by one or both of the light sources 302, 352, and (ii) a second moment in time when a portion of the given optical pulse (for example, from the input beam 316) was detected or received by the one or both of the sensors 306, 356. In some non-limiting embodiments of the present technology, the first moment may be indicative of a moment in time when the controller 310 emits a respective electrical pulse associated with the given optical pulse; and the second moment in time may be indicative of a moment in time when the controller 310 receives, from one or both of the sensors 306, 356, an electrical signal generated in response to receiving the portion of the given optical pulse from the input beam 316.

By the present technology, the controller 310 is configured to determine, based on the first moment in time and the second moment in time, a time-of-flight value and/or a phase modulation value for the emitted pulse of the output beam 314. The time-of-light value T, in a sense, a "round-trip" time for the emitted pulse to travel from the LiDAR system 300 to the object 320 and back to the LiDAR system 300. The controller 310 is thus broadly configured to determine the distance 318 in accordance with the following equation:

$$D = \frac{c \cdot T}{2}, \quad (1)$$

wherein D is the distance 318, T is the time-of-flight value, and c is the speed of light (approximately $3.0 \times 10^8$ m/s).

As previously alluded to, the LiDAR system 300 may be used to determine the distance 318 to one or more other potential objects located in the surroundings 250. By scanning the output beam 314 across the ROI 325 of the LiDAR system 300 in accordance with the predetermined scan pattern, the controller 310 is configured to map distances (similar to the distance 318) to respective data points within the ROI 325 of the LiDAR system 300. As a result, the controller 310 is generally configured to render these data points captured in succession (e.g., the point cloud) in a form of a multi-dimensional map. In some implementations, data related to the determined time of flight and/or distances to objects could be rendered in different informational formats.

As an example, this multi-dimensional map may be used by the electronic device 210 for detecting, or otherwise identifying, objects or determining a shape or distance of potential objects within the ROI 325 of the LiDAR system 300. It is contemplated that the LiDAR system 300 may be configured to repeatedly/iteratively capture and/or generate point clouds at any suitable rate for a given application.

LiDAR System

Operational details of non-limiting embodiments of the LiDAR system 300 will now be described in more detail, with continued reference to FIG. 3. The relative positioning and angles described below correspond to the non-limiting example illustrated in the Figures. It is contemplated that the relative arrangement of the components could change. For example, the placement of the light sources 302, 352 and the sensors 306, 356 relative to the beam splitting elements 304, 354 could be different in different embodiments.

It should be noted that, in various non-limiting embodiments of the present technology, the LiDAR system 300 could include a variety of additional optical components. For example, the LiDAR system 300 may include one or more optical components configured to condition, shape, filter, modify, steer, or direct the output beam 314, the input beam 316, and/or light within the optical branches 305, 355. For example, the LiDAR system 300 may include one or more lenses, mirrors, filters (e.g., band pass or interference filters), optical fibers, circulators, beam splitters, polarizers, polarizing beam splitters, wave plates (e.g., half-wave or quarter-wave plates), diffractive elements, microelectromechanical (MEM) elements, collimating elements, or holographic elements.

As is schematically depicted in FIG. 3, the LiDAR system 300 forms a plurality of internal beam paths along which light propagates from the light sources 302, 352, out of the system 300, and back into the system 300 to the sensors 306, 356. The LiDAR system 300 includes two optical branches 305, 355, which could also be referred to as wavelength modules 305, 355. A first optical branch 305 includes the light source 302 (configured to emit light in the first wavelength band), the sensor 306 (configured to sense light in the first wavelength band), and the beam splitting element 304 for directing light between the dichroic element 399 and the light source 302 and the sensor 306. A second optical branch 355 includes the light source 352 (configured to emit light in the second wavelength band), the second sensor 356 (configured to sense light in the second wavelength band), and the beam splitting element 354 for directing light between the dichroic element 399 and the light source 352 and the sensor 356.

Light within the LiDAR system 300 propagates along the internal beam paths as follows. Light from the light source 302 passes through the beam splitting element 304 and subsequently through the dichroic element 399. Light from the second light source 356 similarly passes through the beam splitting element 354 toward the dichroic element 399.

The dichroic element 399 reflects the light from the light source 352 at an angle such that light from the two light sources 302, 352 become aligned into a combined output beam 314 (at a 45 degree angle in the illustrated example). The combined output beam 314 then propagates to the scanning unit 308 and, in turn, the scanning unit 308 directs the output beam 314 outward towards the surroundings 250 and scans as described above. As the dichroic element 399 aligns the light from the two sources 302, 352, the light from both light sources 302, 352 is equally distributed over the field of view, generally without any additional registration or additional scanning elements needed.

An input beam 316 created by reflected or scattered light of the output beam 314, as reflected or scattered by objects in the surroundings 250, enter the system 300 through the scanning unit 308. The input beam 316 is directed by the scanning unit 308 into the system 300 toward the dichroic element 399. Light from the input beam 316 in the first wavelength band is transmitted by the dichroic element 399 and thus propagates toward the first optical branch 305. The beam splitting element 304 then reflects a portion of the light toward the sensor 306. Light from the input beam 316 from the second wavelength band is reflected by the dichroic element 399 toward the second optical branch 355. The beam splitting element 354 then reflects a portion of the light toward the sensor 356. It is noted that a portion of the light incident on the beam splitting elements 304, 354 may transmit a portion of the light incident thereupon, depending on the particular embodiment of the beam splitting elements 304, 354.

The controller 310 receives information from the sensors 306, 356 indicating the received reflected light signal of each wavelength band. From this information, the controller 310 generates a 3D point map of the surrounding objects, as is described above. According to the non-limiting embodiments of the present technology, the controller 310 generates each point of the 3D point map based on the reflected light signal from both wavelength band, without necessitating mutual synchronization therebetween.

According to certain non-limiting embodiments of the present technology, the center or operating wavelength of one of the light sources 302, 352 may lie within portions of the electromagnetic spectrum that correspond to light produced by the Sun. Therefore, in some cases, sunlight may act as background noise, which can obscure the light signal detected by the corresponding one of the sensors 306, 356. This solar background noise can result in false-positive detections and/or may otherwise corrupt measurements. In such a case, it is contemplated that the controller 310 could determine that the signal quality of the wavelength band closer to the spectrum of light produced by the Sun is below a threshold. The controller 310 could then generate the 3D map based solely on the other one of the wavelength bands. In this way, the LiDAR system 300 could still generate a good quality 3D map, even when bright sunlight could be interfering in the signal quality in other systems.

According to certain non-limiting embodiments of the present technology, the wavelength band of one of the light sources 302, 352 may be configured to operate in a given environmental condition. For example, the center or operating wavelength of one of the light sources 302, 352 may lie within portions of the electromagnetic spectrum that correspond to wavelengths absorbed or highly scattered by precipitation, and the other one of the light sources 302, 352 may lie within portions of the electromagnetic spectrum that correspond to wavelengths that are not generally absorbed or scattered by precipitation. In this way, the LiDAR system 300 could still generate a good quality 3D map, even when bright sunlight could be interfering in the signal quality in other systems.

It is contemplated that the LiDAR system 300 could be configured to have at least one light source configured to operate in a given environmental condition, similarly to the above non-limiting examples. Such an environmental condition could include, but is not limited to: an amount of daylight, an amount of precipitation (such as rain, snow, fog, etc.) or the like.

Method for Controlling the System

Figure 4:
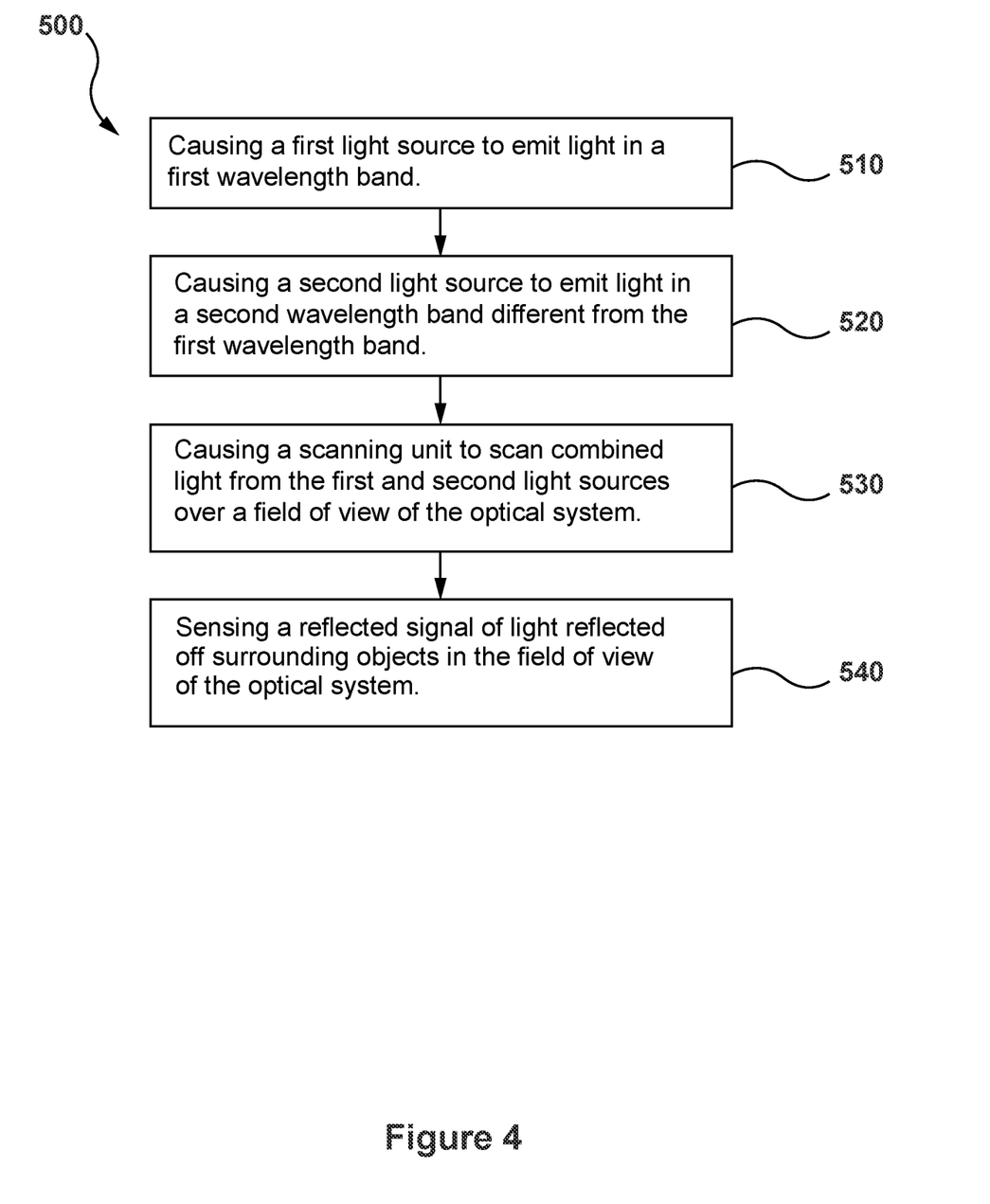
FIG. 4 depicts a flowchart illustrating an example method for operating the LiDAR system of FIG. 3.

With reference to FIG. 4, a flowchart of a method 500 for controlling the LiDAR system 300, the method 500 will now be described in more detail according to non-limiting embodiments of the present technology.

In some non-limiting embodiments of the present technology, the method 500 may be implemented by the controller 310 communicatively connected to the LiDAR system 300. As previously discussed, in at least some non-limiting embodiments of the present technology, the controller 310 may include one or more processors and may be implemented in a similar manner to the electronic device 210 and/or the computer system 100, without departing from the scope of the present technology. The method 500 begins at step 510.

Step 510: Causing a First Light Source to Emit Light in a First Wavelength Band At step 510, the controller 310 provides instructions, a control signal, and/or a trigger signal to the light source 302 indicating when the light source 302 is to emit pulses of light towards the scanner unit 308, the light source 302 being configured to emit light in the first wavelength band. Depending on the embodiment, the controller 310 could control the pulse frequency at which pulses are emitted from the light source 302.

Step 520: Causing a Second Light Source to Emit Light in a Second Wavelength Band Different from the First Wavelength Band At step 520, the controller 310 provides instructions, a control signal, and/or a trigger signal to the light source 352 indicating when the light source 352 is to emit pulses of light towards the scanner unit 308, the light source 352 being configured to emit light in the second wavelength band. Depending on the embodiment, the controller 310 could control the pulse frequency at which pulses are emitted from the light source 352.

Depending on the particular embodiment, it is contemplated that the steps 510 and 520 could be performed in any order, including simultaneously. In one or more steps associated with the method 500, the controller 310 may be configured to cause the light sources 302, 352 to begin to emit light towards dichroic element 399 and the scanning unit 308 in certain conditions. Such conditions may include but are not limited to: upon operating the vehicle 220 in self-driving mode, when the vehicle 220 is in motion irrespective of the driving mode, when the vehicle 220 is stationary, when the vehicle 220 is initially turned on, or based on a manual operation performed by a user (not depicted) operating the vehicle 220 etc.

Step 530: Causing a Scanning Unit to Scan Combined Light from the Light Sources Over a Field of View of the Optical System At step 530, the controller 310 provides instructions, a control signal, and/or a trigger signal to the cause the scanning unit 308 to direct the pulses of light, of the output beam 314, out from the LiDAR system 300. As is described above, the output beam 314 is formed by combining light from the two light sources 302, 352 by the dichroic element 399.

Depending on the specific implementation, pulses are scanned over portions or the entirety of the field of view of the LiDAR system 300 to create 3D maps of the surroundings falling within the field of view.

Step 540: Sensing a Reflected Light of Light Reflected Off Surrounding Objects in the Field of View of the Optical System At step 540, one or both of the sensors 306, 356 senses a reflected signal of light reflected off surrounding objects in the field of view of the LiDAR system 300. The input beam 316, entering the LiDAR system 300 through the scanning unit 308, is separated by the dichroic element 399 and directed toward the corresponding one of the sensors 306, 356 according to the wavelength band of the incoming light. The controller 310 then receives a signal and/or information corresponding to one or more reflected light signals, sensed by one or both of the sensors 306, 356.

In at least some non-limiting embodiments of the present technology, the sensing at step 540 could include sensing a plurality of reflected light signals reflected from one or more regions of interest of the field of view.

In one or more non-limiting steps associated with the method 500, the sensing the reflected signal at step 540 further includes sensing a first portion of the reflected signal in the first wavelength band by the sensor 306 and sensing a second portion of the reflected signal in the second wavelength band by the second sensor 356.

In at least some non-limiting embodiments of the present technology, the method 500 further includes generating by the controller 310, based on the reflected signal, a 3D point map of the surrounding objects.

In at least some such non-limiting embodiments, the method 500 could further include selecting, based on one or more quality characteristics associated with the reflected signal, one of the first portion and the second portion thereof for generating the 3D point map. In such a case, for example, the signal corresponding to one wavelength band could surpass some predetermined noise threshold, and the controller 310 could generate the 3D point map based only on the signal from the other wavelength band. In this way, the noisier wavelength band could be excluded and lead to a less noisy 3D map, relative to a map created with both signals.

In at least some non-limiting embodiments of the present technology, the method 500 could further include generating a respective optical pulse by each one of the first light source and the second light source. In such an embodiment, the controller 310 then could also cause each one of the light sources 302, 352 to simultaneously generate optical pulses.

In at least some non-limiting embodiments of the present technology, the light from the light sources 302, 352 is equally distributed across the field of view of the LiDAR system 300.

It should be apparent to those skilled in the art that at least some embodiments of the present technology aim to expand a range of technical solutions for addressing a particular technical problem, namely improving spatial detail of a LiDAR system while limiting effects of signal quality.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that some of these steps may be combined, sub-divided, or re-ordered without departing from the teachings of the present technology. Accordingly, the order and grouping of the steps is not a limitation of the present technology.

The invention claimed is:

1. An optical system comprising:
a housing;
a first light source disposed in the housing, the first light source being configured to emit light in a first wavelength band;
a second light source disposed in the housing, the second light source being configured to emit light in a second wavelength band, the second wavelength band being different from the first wavelength band;
a dichroic mirror configured for combining light from the first light source and the second light source into an output light beam to be scanned over a field of view;
a scanner configured to direct output beam outwardly from the optical system, the scanner being disposed in the housing;
a controller communicatively coupled with the scanner; and
a first sensor and a second sensor communicatively coupled with the controller and disposed in the housing,
the first sensor being configured to sense light reflected off surrounding objects into the optical system in the first wavelength; and
the second sensor being configured to sense light reflected off the surrounding objects into the optical system in the second wavelength;
a first beam splitter disposed in the housing, the first beam splitter being arranged to:
direct light incident thereupon from the first light source toward the dichroic mirror; and
direct light incident thereupon from the dichroic mirror toward the first sensor; and
a second beam splitter disposed in the housing, the second beam splitter being arranged to:
direct light incident thereupon from the second light source toward the dichroic mirror; and
direct light incident thereupon from the dichroic mirror toward the second sensor;
the optical system defining:
a first optical branch including the first light source, the first sensor, and the first beam splitter; and
a second optical branch including the second light source, the second sensor, and the second beam splitter.

2. The optical system of claim 1, wherein at least one of the first sensor and the second sensor is further configured to sense light in a third wavelength band, the third wavelength band being different from the first wavelength band and the second wavelength band, the light of the third wavelength band corresponding to a background radiation within an area of location of the surrounding objects.

3. The optical system of claim 1, wherein each one of the first beam splitter and the second beam splitter comprises one of a plate beam splitter, a cube beam splitter, and a pellicle beam splitter.

4. The optical system of claim 1, wherein:
the light reflected off the surrounding objects includes at least:
a first light portion corresponding to the light emitted by the first light source and subsequently reflecting off the surrounding objects, and
a second light portion corresponding to the light emitted by the second light source and subsequently reflecting off the surrounding objects.

5. The optical system of claim 4, wherein the dichroic mirror is further arranged to:
   direct the first light portion into the first optical branch, and
   direct the second light portion into the second optical branch.

6. The optical system of claim 3, wherein the dichroic mirror is further configured to:
   direct the first light portion toward the first sensor, and
   direct the second light portion toward the second sensor.

7. The optical system of claim 1, wherein a center wavelength of the first wavelength band and a center wavelength of the second wavelength band are separated, within a spectrum of electromagnetic radiation, by a predetermined wavelength interval.

8. The optical system of claim 1, wherein at least one of the first wavelength band and the second wavelength band is configured to operate in a given environmental condition, the given environmental condition being associated with at least one of: an amount of daylight and an amount of precipitation.

9. The optical system of claim 1, wherein the first light source and the second light source are monochromatic light sources respectively associated with a first operating wavelength and a second operating wavelength, the first operating wavelength being different from the second operating wavelength.

10. The optical system of claim 1, wherein the scanner further comprises an exit window facing outwardly from the optical system, such that:
    the dichroic mirror and the exit window are arranged sequentially along a common optical axis, thereby defining a single optical path for the light emitted by the first light source and the light emitted by the second light source from the dichroic mirror to the exit window.

11. The optical system of claim 10, wherein:
    the scanner defines the field of view of the optical system; and
    the light from the first light source and the light from the second light source being equally distributed across the field of view.

12. The optical system of claim 1, wherein the controller is further communicatively coupled with the first light source and the second light source, the controller being configured to cause each one of the first light source and the second light source to emit the light in the respective one of the first wavelength band and the second wavelength band simultaneously, thereby generating the output beam.

13. The optical system of claim 12, wherein:
    the controller is further configured to generate a 3D point map of the surrounding objects based on the light reflected therefrom,
    each point of the 3D point map being generated in response to both the first light source and the second light source emitting the light without necessitating mutual synchronization therebetween.

* * * * *